(12) United States Patent
Watanabe

(10) Patent No.: US 10,541,450 B2
(45) Date of Patent: Jan. 21, 2020

(54) ALKALINE SECONDARY BATTERY

(71) Applicant: Maxell Holdings, Ltd., Otokuni-gun, Kyoto (JP)

(72) Inventor: Mitsutoshi Watanabe, Kyoto (JP)

(73) Assignee: MAXELL HOLDINGS, LTD., Kyoto (JP)

( * ) Notice: Subject to any disclaimer, the term of this patent is extended or adjusted under 35 U.S.C. 154(b) by 0 days.

(21) Appl. No.: 15/758,299

(22) PCT Filed: Sep. 14, 2016

(86) PCT No.: PCT/JP2016/077082
§ 371 (c)(1),
(2) Date: Mar. 7, 2018

(87) PCT Pub. No.: WO2017/047628
PCT Pub. Date: Mar. 23, 2017

(65) Prior Publication Data
US 2018/0254527 A1    Sep. 6, 2018

(30) Foreign Application Priority Data

Sep. 14, 2015 (JP) ................. 2015-180363
Dec. 25, 2015 (JP) ................. 2015-252761
(Continued)

(51) Int. Cl.
*H01M 6/04* (2006.01)
*H01M 10/26* (2006.01)
(Continued)

(52) U.S. Cl.
CPC ......... *H01M 10/26* (2013.01); *H01M 10/045* (2013.01); *H01M 10/0459* (2013.01); *H01M 10/32* (2013.01)

(58) Field of Classification Search
CPC .............. H01M 10/26; H01M 10/045; H01M 10/0459; H01M 10/285; H01M 10/32;
(Continued)

(56) References Cited

U.S. PATENT DOCUMENTS

2003/0082450 A1    5/2003  Tanoue et al.
2004/0166417 A1*   8/2004  Nishio ................ C08G 65/14
                                                   429/317
(Continued)

FOREIGN PATENT DOCUMENTS

JP    56-167270 A    12/1981
JP    58-131668 A     8/1983
(Continued)

OTHER PUBLICATIONS

Translation of JP2002158006 (Year: 2002).*
International Search Report for PCT/JP2016/077082 (PCT/ISA/210) dated Dec. 20, 2016.

Primary Examiner — Jane J Rhee
(74) Attorney, Agent, or Firm — Birch, Stewart, Kolasch & Birch, LLP

(57) ABSTRACT

An alkaline secondary battery having excellent charge-discharge cycle characteristics is provided. The alkaline secondary battery includes a positive electrode, a negative electrode, and a separator interposed between the positive electrode and the negative electrode. The positive electrode contains a silver oxide. The negative electrode contains zinc-based particles selected from the group consisting of zinc particles and zinc alloy particles. The separator holds an alkaline electrolyte solution. An anion conductive membrane is disposed between the negative electrode and the separator. The anion conductive membrane includes a polymer as a matrix and particles of at least one metal compound selected from the group consisting of metal oxides, metal (Continued)

hydroxides, metal carbonates, metal sulfates, metal phosphates, metal borates, and metal silicates, which are dispersed in the matrix.

16 Claims, 1 Drawing Sheet

(30) Foreign Application Priority Data

Dec. 25, 2015 (JP) .................. 2015-254042
Mar. 29, 2016 (JP) .................. 2016-065465

(51) Int. Cl.
*H01M 10/04* (2006.01)
*H01M 10/32* (2006.01)

(58) Field of Classification Search
CPC ............ H01M 10/34; H01M 10/4235; H01M 10/0427; H01M 4/34; H01M 4/42; H01M 4/54; H01M 2300/0014; H01M 2300/0091
See application file for complete search history.

(56) References Cited

U.S. PATENT DOCUMENTS

| | | |
|---|---|---|
| 2015/0364789 A1 | 12/2015 | Ogawa et al. |
| 2015/0364790 A1 | 12/2015 | Yonehara et al. |

FOREIGN PATENT DOCUMENTS

| | | |
|---|---|---|
| JP | 63-126163 A | 5/1988 |
| JP | 2-139857 A | 5/1990 |
| JP | 2001-202958 A | 7/2001 |
| JP | 2002-158006 A | 5/2002 |
| JP | 2014-167910 A | 9/2014 |
| JP | 2015-15229 A | 1/2015 |
| JP | 2015-95286 A | 5/2015 |
| JP | 2015-191782 A | 11/2015 |

* cited by examiner

ALKALINE SECONDARY BATTERY

TECHNICAL FIELD

The present invention relates to an alkaline secondary battery having excellent charge-discharge cycle characteristics.

BACKGROUND ART

An alkaline battery (silver oxide battery) includes a positive electrode containing a silver oxide, a negative electrode containing zinc or zinc alloy, and an alkaline electrolyte solution. This alkaline battery has been widely and generally used as a primary battery.

On the other hand, the alkaline battery having the above configuration has also been studied for use as a secondary battery (see Patent Document 1).

However, when the alkaline battery having the above configuration is repeatedly charged and discharged, the battery capacity can be sharply reduced with only a small number of repetitions. This may be attributed to the negative electrode. For example, zinc dendrite grows from the negative electrode and extends to the opposite electrode, which will cause an internal short circuit.

To deal with this problem, when zinc is contained in a negative electrode of a secondary battery, a technique has been proposed to add calcium hydroxide to the negative electrode so that the precipitation of zinc dendrite is reduced (see Patent Documents 2 and 3).

Similarly, a technique has been proposed to add an organic matter with a particular structure to an electrolyte (electrolyte solution) so that the precipitation of zinc dendrite is reduced (see Patent Document 4).

Moreover, Patent Documents 5 and 6 have proposed the use of an anion conducting material in a separator or an electrolyte of an alkaline battery to improve the cycle life of the alkaline battery. The anion conducting material is formed by incorporating various metal compounds in a polymer that serves as a matrix.

PRIOR ART DOCUMENTS

Patent Documents

Patent Document 1: JP 2001-202958 A
Patent Document 2: JP S63(1988)-126163 A
Patent Document 3: JP H2(1990)-139857A
Patent Document 4: JP 2015-191782 A
Patent Document 5: JP 2015-15229A
Patent Document 6: JP 2015-95286 A

DISCLOSURE OF INVENTION

Problem to be Solved by the Invention

However, using only the materials disclosed in Patent Documents 2 to 6 is not sufficient to improve the charge-discharge cycle characteristics of an alkaline secondary battery that includes a positive electrode containing a silver oxide and a negative electrode containing zinc or zinc alloy.

With the foregoing in mind, it is an object of the present invention to provide an alkaline secondary battery having excellent charge-discharge cycle characteristics.

Means for Solving Problem

An alkaline secondary battery of the present invention that has been able to achieve the above object includes a positive electrode, a negative electrode, and a separator interposed between the positive electrode and the negative electrode. The positive electrode contains a silver oxide. The negative electrode contains zinc-based particles selected from the group consisting of zinc particles and zinc alloy particles. The separator holds an alkaline electrolyte solution. An anion conductive membrane is disposed between the negative electrode and the separator. The anion conductive membrane includes a polymer as a matrix and particles of at least one metal compound selected from the group consisting of metal oxides, metal hydroxides, metal carbonates, metal sulfates, metal phosphates, metal borates, and metal silicates, which are dispersed in the matrix.

Effects of the Invention

The present invention can provide an alkaline secondary battery having excellent charge-discharge cycle characteristics.

DESCRIPTION OF THE INVENTION

Figure 1:
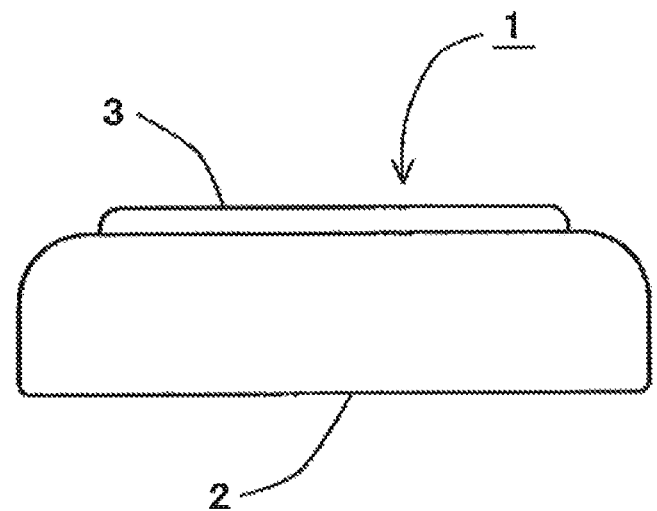
FIG. 1 is a side view schematically illustrating an example of an alkaline secondary battery of the present invention.

In an alkaline secondary battery that includes a positive electrode containing a silver oxide and a negative electrode containing zinc particles or zinc alloy particles, the repetition of charge and discharge may pose the following problems: (i) the shape of the negative electrode is gradually deformed to prevent a sufficient electrical contact with a negative electrode can (a sealing plate or an outer can); and (ii) zinc dendrite grows in the negative electrode and enters the separator, resulting in a short circuit. Therefore, the capacity of such an alkaline secondary battery including the above positive electrode and negative electrode is reduced at a relatively early stage due to repeated charge and discharge.

In the present invention, a particular anion conductive membrane as well as a separator that holds an alkaline electrolyte solution is interposed between the positive electrode and the negative electrode, and the anion conductive membrane is provided on the negative electrode. This configuration can maintain the form of the negative electrode and also suppress the generation or growth of zinc dendrite in the negative electrode, even if the alkaline secondary battery is repeatedly charged and discharged. Thus, the alkaline secondary battery of the present invention can have excellent charge-discharge cycle characteristics.

As described above, in the alkaline secondary battery of the present invention, the separator and the anion conductive membrane are interposed between the positive electrode and the negative electrode.

Examples of the separator include the following: a nonwoven fabric mainly composed of vinylon and rayon; a vinylon-rayon nonwoven fabric (vinylon-rayon mixed paper); a polyamide nonwoven fabric; a polyolefin-rayon nonwoven fabric; vinylon paper; vinylon-linter pulp paper; and vinylon-mercerized pulp paper. Moreover, the separator may be a laminate of a hydrophilic microporous polyolefin film (such as a microporous polyethylene film or a microporous polypropylene film), a cellophane film, and a liquidabsorbing layer (i.e., an electrolyte holding layer) such as vinylon-rayon mixed paper. The thickness of the separator is preferably 20 to 500 µm.

The amount of the alkaline electrolyte solution in the separator is not particularly limited. The separator may hold the alkaline electrolyte solution to the extent that it can absorb.

The anion conductive membrane includes a polymer as a matrix and particles of a metal compound dispersed in the matrix. The metal compound is at least one selected from the group consisting of metal oxides, metal hydroxides, metal carbonates, metal sulfates, metal phosphates, metal borates, and metal silicates.

The polymer used as a matrix of the anion conductive membrane is not particularly limited. Examples of the polymer include the following: fluorocarbon resins such as polyvinylidene fluoride (PVDF), polytetrafluoroethylene (PTFE), a vinylidene fluoride-hexafluoropropylene copolymer (PVDF-HFP), a vinylidene fluoride-chlorotrifluoroethylene copolymer (PVDF-CTFE), a vinylidene fluoride-tetrafluoroethylene copolymer (PVDF-TFE), and a vinylidene fluoride-hexafluoropropylene-tetrafluoroethylene copolymer (PVDF-HFP-TFE); polyolefins such as polyethylene (PE) and polypropylene (PP); polystyrene; and polymers having a polar group or a polar bond in molecules (referred to as "polar polymers" in the following).

Examples of the polar polymers include the following: a polymer containing an amino group such as polyalkyleneimine (polyethyleneimine); a polymer containing an ester bond (ester group) such as (alkoxy)polyalkylene glycol mono(meth)acrylate; polymers containing carboxylate groups (i.e., salts of carboxyl groups) such as an alkali metal salt (e.g., a sodium salt) of poly(meth)acrylic acid, a magnesium salt of poly(meth)acrylic acid, an alkaline earth metal salt (e.g., a calcium salt) of poly(meth)acrylic acid, an ammonium salt of poly(meth)acrylic acid, an alkali metal salt (e.g., a sodium salt) of polymaleic acid, a magnesium salt of polymaleic acid, an alkaline earth metal salt (e.g., a calcium salt) of polymaleic acid, and an ammonium salt of polymaleic acid; and polyamide. In the above examples, the "(meth)acrylic acid" is a term that combines acrylic acid and methacrylic acid.

The anion conductive membrane may include either one type or two or more types of polymers listed above as a matrix. The anion conductive membrane more preferably includes the fluorocarbon resins, and further preferably includes the fluorocarbon resins and the polar polymers.

In the anion conductive membrane, the particles of the metal compound are dispersed. The particles of the metal compound may be particles of at least one compound selected from the group consisting of metal oxides, metal hydroxides, metal carbonates, metal sulfates, metal phosphates, metal borates, and metal silicates.

Examples of metal oxides include a cerium oxide, a zirconium oxide, and hydrotalcite. The hydrotalcite is a compound typified by the following general formula (1).

$$\{M^1{}_{1-x}M^2{}_x(OH)_2\}(A^{n-})_{x/n} \cdot mH_2O \qquad (1)$$

In the general formula (1), $M^1$ represents, e.g., Mg, Fe, Zn, Ni, Co, Cu, Ca, or Li, $M^2$ represents, e.g., Al, Fe, or Mn, A represents, e.g., $CO_3{}^{2-}$, m is an integer of 0 or more, n is 2 or 3, and x satisfies $0.2 \leq x \leq 0.4$.

Examples of hydroxides (metal hydroxides) include a cerium hydroxide and a zirconium hydroxide. Examples of sulfates include ettringite. Examples of phosphates include hydroxyapatite.

Among the above metal compounds, an intercalation compound with anion exchange ability such as hydrotalcite is preferred.

The average particle size of the particles of the metal compound is preferably 5 nm or more, more preferably 10 nm or more, and particularly preferably 100 nm or more. The average particle size of the particles of the metal compound is also preferably 100 µm or less, more preferably 10 µm or less, and particularly preferably 1 µm or less.

In the present specification, the average particle size of the particles of the metal compound and the average particle size of a silver oxide (as will be described later) mean a particle diameter ($D_{50}$) at a cumulative frequency of 50% in the volume-based distribution, which is measured with a laser scattering particle size distribution analyzer (e.g., "LA-920" manufactured by HORIBA, Ltd.) by dispersing the particles in a medium that does not dissolve those particles.

The proportion of the polymer (i.e., the polymer used as a matrix) in the anion conductive membrane is preferably 0.1% by mass or more, more preferably 1% by mass or more, even more preferably 10% by mass or more, and particularly preferably 40% by mass or more. The proportion of the polymer in the anion conductive membrane is also preferably 90% by mass or less, more preferably 80% by mass or less, even more preferably 70% by mass or less, and particularly preferably 60% by mass or less.

The proportion of the particles of the metal compound in the anion conductive membrane is preferably 0.1% by mass or more, more preferably 1% by mass or more, even more preferably 5% by mass or more, and particularly preferably 30% by mass or more. The proportion of the particles of the metal compound in the anion conductive membrane is also preferably 90% by mass or less, more preferably 80% by mass or less, even more preferably 60% by mass or less, and particularly preferably 50% by mass or less.

The thickness of the anion conductive membrane is preferably 10 µm or more, more preferably 20 µm or more, and particularly preferably 40 µm or more in terms of favorably ensuring the effect of the anion conductive membrane. However, if the anion conductive membrane is too thick, the volume occupied by the anion conductive membrane in the battery is increased, which in turn may reduce the amount of a positive electrode active material or a negative electrode active material introduced. Therefore, the thickness of the anion conductive membrane is preferably 500 µm or less, and more preferably 250 µm or less in terms of further increasing the battery capacity.

The anion conductive membrane can be produced in the following manner. For example, a composition for forming the anion conductive membrane is prepared by dispersing the polymer and the particles of the metal compound in water or an organic solvent such as N-methyl-2-pyrrolidone (in this case, the polymer may be dissolved in water or the organic solvent). The composition is applied to the surface of a substrate, dried, and then removed from the substrate. The composition may be pressed after drying. Although the anion conductive membrane does not contain an alkaline electrolyte solution at this stage, the anion conductive membrane is placed in a battery and absorbs the alkaline electrolyte solution that is injected into the battery. Thus, the anion conductive membrane can contain the alkaline electrolyte solution. Alternatively, the anion conductive membrane after drying (or pressing) may be immersed in the alkaline electrolyte solution. Then, the anion conductive membrane that has previously absorbed the alkaline electrolyte solution can be used for the assembly of the battery.

The negative electrode of the alkaline secondary battery of the present invention contains zinc particles or zinc alloy particles (which may be collectively called "zinc-based particles" in the following). The zinc present in the particles acts as an active material of the negative electrode. The zinc alloy particles are composed of zinc, alloy components such as indium, bismuth, aluminum, and magnesium, and unavoidable impurities. Depending on the elemental species and content of the alloy components, the alloy components do not form a uniform solid solution with a parent phase of zinc and may lead to local segregation in the particles.

The content of the alloy components is not necessarily limited. For example, the content of the alloy components is preferably 0.005 to 0.05% by mass (50 to 500 ppm) for indium, 0.005 to 0.05% by mass (50 to 500 ppm) for bismuth, 0.0005 to 0.02% by mass (5 to 200 ppm) for aluminum, and 0.0001 to 0.002% by mass (1 to 20 ppm) for magnesium. The negative electrode may contain either one type or two or more types of zinc-based particles.

It is preferable that the zinc-based particles include a mercury-free alloy component. The use of such zinc-based particles in the battery can reduce the environmental pollution caused by battery disposal. It is also preferable that the zinc-based particles include a lead-free alloy component for the same reason as mercury.

The particle size of the zinc-based particles may be defined as follows. For example, the proportion of the particles with a particle diameter of 75 µm or less is preferably 50% by mass or less, and more preferably 30% by mass or less of the whole powder. Moreover, the proportion of the particles with a particle diameter of 100 to 200 µm is preferably 50% by mass or more, and more preferably 90% by mass or more of the whole powder. In the present specification, the particle size of the zinc-based particles can be obtained by the same method as that for measuring the average particle size of the "particles of the metal compound," as described above.

In addition to the zinc-based particles, e.g., a gelling agent (such as sodium polyacrylate or carboxymethyl cellulose) may be added to the negative electrode as needed. This may be mixed with an alkaline electrolyte solution to form a negative electrode agent (gel-like negative electrode). The amount of the gelling agent in the negative electrode is preferably, e.g., 0.5 to 1.5% by mass.

The negative electrode can be a non-gel negative electrode that does not substantially contain the above gelling agent. If the alkaline electrolyte solution is thickened by the action of the gelling agent, the gelling agent will interfere with the movement of ions in the electrolyte solution, so that the load characteristics of the battery may be reduced. Therefore, the "non-gel" negative electrode can be effective in improving the ion conductivity of the alkaline electrolyte solution and further enhancing the load characteristics (particularly the heavy-load characteristics) because it does not contain the gelling agent or contains the gelling agent so as not to thicken the alkaline electrolyte solution.

In the negative electrode containing the zinc-based particles, when a charging current is concentrated in some portion of the negative electrode, a zinc precipitation grows in a needle shape, and thus zinc dendrite is produced.

However, if the negative electrode contains polyalkylene glycols, the charging current is not concentrated on one point, but dispersed on the surface of the zinc-based particles. This can suppress the growth of zinc dendrite. Moreover, it is also expected to suppress the generation of gas due to the growth of zinc dendrite, and to improve the storage characteristics. Therefore, the negative electrode of the alkaline secondary battery of the present invention preferably contains polyalkylene glycols.

In the technology of Patent Document 4, the electrolyte is required to contain an alkali metal salt such as $K_2CO_3$ along with an electrolyte salt such as KOH to ensure the effective action of polyalkylene glycols. Further, the content of the alkali metal salt should be increased to 30% by mass or more, which may lead to problems such as a reduction in the discharge characteristics of the battery. On the other hand, the polyalkylene glycols previously contained in the negative electrode can achieve their effects even in small amounts, and thus can prevent the problems such as a reduction in the discharge characteristics of the battery.

The polyalkylene glycols used in the alkaline secondary battery are compounds in which alkylene glycols such as ethylene glycol, propylene glycol, and butylene glycol are polymerized or copolymerized. The compounds may have a cross-linked structure, a branched structure, or a structure having the substituted end. The compounds with a weight average molecular weight of about 200 or more are preferably used. The upper limit of the weight average molecular weight is not particularly limited. However, in order to easily achieve the effects of the compounds to be added, the compounds are preferably water-soluble and generally have a weight average molecular weight of 20000 or less, and more preferably 5000 or less.

Specifically, preferred examples include polyethylene glycols in which ethylene glycol is polymerized, and polypropylene glycols in which propylene glycol is polymerized.

The polyethylene glycols preferably include polyethylene glycol, polyethylene oxide, and a straight-chain compound that is expressed by, e.g., the following general formula (2).

$$X{\text{-}}[CH_2{-}CH_2{-}O]{\text{-}}Y_n \tag{2}$$

In the general formula (2), X represents an alkyl group, a hydroxyl group, a carboxyl group, an amino group, or a halogen atom, Y represents a hydrogen atom or an alkyl group, and n is 4 or more on average.

In the general formula (2), n corresponds to the average addition molar number of ethylene oxide in the polyethylene glycols. Moreover, n is 4 or more on average, and the upper limit of n is not particularly limited. However, the compounds with a weight average molecular weight of about 200 to 20000 are preferably used.

The polypropylene glycols preferably include polypropylene glycol, polypropylene oxide, and a straight-chain compound that is expressed by, e.g., the following general formula (3).

$$Z{\text{-}}\left[CH_2{-}\underset{\underset{CH_3}{|}}{CH}{-}O\right]_m{\text{-}}T \tag{3}$$

In the general formula (3), Z represents an alkyl group, a hydroxyl group, a carboxyl group, an amino group, or a halogen atom, T represents a hydrogen atom or an alkyl group, and m is 3 or more on average.

In the general formula (3), m corresponds to the average addition molar number of propylene oxide in the polypropylene glycols. Moreover, m is 3 or more on average, and the upper limit of m is not particularly limited. However, the compounds with a weight average molecular weight of about 200 to 20000 are preferably used.

The polyalkylene glycols may be copolymerized compounds including an ethylene oxide unit and a propylene oxide unit (e.g., polyoxyethylene polyoxypropylene glycol).

The content of the polyalkylene glycols in the negative electrode is preferably 0.01 parts by mass or more, and more preferably 0.1 parts by mass or more with respect to 100 parts by mass of the zinc-based particles in terms of favorably improving the charge-discharge cycle characteristics and the storage characteristics of the battery. The content of the polyalkylene glycols in the negative electrode is also preferably 5 parts by mass or less, and more preferably 1 part by mass or less with respect to 100 parts by mass of the zinc-based particles in terms of restricting the amount of the polyalkylene glycols and further improving the discharge characteristics of the battery.

In the alkaline secondary battery of the present invention, the generation or growth of zinc dendrite can also be suppressed by using the negative electrode that contains a calcium compound.

When zinc is dissolved, the calcium compound reacts with zinc to form a precipitate such as $CaZn(OH)_4$ by, e.g., the following reaction: $Ca(OH)_2+Zn(OH)_4{}^{2-}+H_2O \rightarrow CaZn(OH)_4 \cdot H_2O+2OH-$. Therefore, the calcium compound can prevent the dispersion and movement of zinc ions in the electrolyte solution.

However, when the calcium compound is used to suppress the generation of zinc dendrite in the negative electrode, it is necessary that the discharge product $Zn(OH)_4{}^{2-}$ react with calcium hydroxide and be changed to $CaZn(OH)_4$, which is an insoluble compound. Therefore, the content of calcium hydroxide with respect to zinc should be relatively high. This makes it difficult to sufficiently suppress the generation of zinc dendrite without reducing the battery capacity.

On the other hand, the calcium compound contained in the negative electrode of the alkaline secondary battery of the present invention is considered to have the effect of suppressing zinc dendrite in cooperation with the anion conductive membrane or the polyalkylene glycols. Therefore, a relatively small amount of the calcium compound may be used. Thus, it is possible to prevent a reduction in the discharge characteristics of the battery due to the use of the calcium compound.

Examples of the calcium compound used in the alkaline secondary battery include compounds such as calcium hydroxide, calcium oxide, calcium chloride, and calcium sulfate that react with $Zn(OH)_4{}^{2-}$, which is produced during discharge, to form composite compounds including $CaZn(OH)_4$, and the composite compounds themselves. Among them, calcium hydroxide and calcium oxide are preferred.

The content of the calcium compound in the negative electrode is preferably 5 parts by mass or more, more preferably 8 parts by mass or more, and particularly preferably 10 parts by mass or more with respect to 100 parts by mass of the zinc-based particles in order to more favorably improve the charge-discharge cycle characteristics of the battery. The content of the calcium compound in the negative electrode is also preferably 40 parts by mass or less, more preferably 30 parts by mass or less, and particularly preferably 20 parts by mass or less with respect to 100 parts by mass of the zinc-based particles in order to prevent a reduction in the discharge capacity or discharge characteristics of the battery.

A method for incorporating the polyalkylene glycols and the calcium compound in the negative electrode is not particularly limited. For example, a composition may be prepared by directly mixing the polyalkylene glycols or the calcium compound with the zinc-based particles. Alternatively, a composition may be prepared by dissolving or dispersing the polyalkylene glycols or the calcium compound in a solvent such as water and mixing this solution with the zinc-based particles. In the former case, the composition may be used to prepare the negative electrode. In the latter case, the solvent may be evaporated from the composition so that the polyalkylene glycols or the calcium compound adhere to the surface of the zinc-based particles. Then, the zinc-based particles coated with the polyalkylene glycols or the calcium compound may be used to prepare the negative electrode.

The amount of the polyalkylene glycols or the calcium compound covering the surface of the zinc-based particles may be adjusted in such a manner that the content of these compounds in the negative electrode falls in the above range.

The polyalkylene glycols and the calcium compound may be present in the negative electrode after the battery is assembled. In this case, the polyalkylene glycols and the calcium compound may be contained in the constituents other than the negative electrode, such as the alkaline electrolyte solution or the separator, during the assembly of the battery, and a part or the whole of the polyalkylene glycols and the calcium compound may be moved into the negative electrode after the battery is assembled.

For example, if the polyalkylene glycols and the calcium compound are contained in the separator, these compounds in the separator may be dissolved in the electrolyte solution and then moved into the negative electrode after the battery is assembled.

The negative electrode preferably contains an indium compound. The indium compound contained in the negative electrode can more effectively prevent the generation of gas due to a corrosion reaction between the zinc-based particles and the alkaline electrolyte solution.

Examples of the indium compound include indium oxide and indium hydroxide.

The amount of the indium compound in the negative electrode is preferably 0.003 to 1 with respect to 100 of the zinc-based particles at a mass ratio.

The content of the zinc-based particles in the negative electrode is preferably, e.g., 60% by mass or more, and more preferably 65% by mass or more. The content of the zinc-based particles in the negative electrode is also preferably 75% by mass or less, and more preferably 70% by mass or less.

The positive electrode of the alkaline secondary battery of the present invention contains a silver oxide such as AgO or $Ag_2O$. For example, the positive electrode may be a molded body of a positive electrode mixture that contains a silver oxide and a conductive assistant. Alternatively, the positive electrode may have a structure in which a positive electrode mixture layer that contains a silver oxide and a conductive assistant is formed on one side or both sides of a current collector.

When an alkaline battery that includes a positive electrode containing a silver oxide is used as a secondary battery, it is known that the resistance is significantly increased during charge. The reason for this is as follows. As the battery is discharged, Ag is produced in the positive electrode. The Ag is oxidized and changed to an oxide by the subsequent charge. However, $O^{2-}$ ions are not easily dispersed in the crystal lattice of $Ag_2O$ thus formed. Therefore, the oxidation reaction of $Ag_2O$ to AgO does not proceed smoothly.

Thus, it is desirable that the above problem in the positive electrode be addressed in order to improve the charge-discharge cycle characteristics of the alkaline secondary battery that includes the positive electrode containing the silver oxide. For this purpose, particles of the silver oxide preferably contain at least one element selected from the group consisting of Bi, Pb, Zr, Sn, Mn, Ti, and Se. The silver oxide particles containing any of these elements may facilitate smooth dispersion of $O^{2-}$ ions in the oxide that is formed by charging the battery. Consequently, it is possible to suppress an increase in the resistance of the positive electrode during charge.

The elements contained in the particles of the silver oxide may have a certain effect even if they are in the form of an oxide and present in the grain boundary or the like. However, it is more preferable that the elements are present in the crystal lattice of the silver oxide, since they can easily achieve the above effect.

The elements contained in the particles of the silver oxide may be in an oxidation state such as trivalent or tetravalent. The silver oxide containing at least one of those elements can be expected to have the above effect.

The content of the elements in the silver oxide is preferably 0.3% by mass or more, more preferably 0.5% by mass or more, and particularly preferably 2% by mass or more in terms of favorably ensuring the effect of improving the charge-discharge cycle characteristics of the battery by the elements. However, if the amount of the elements in the silver oxide is too large, the battery capacity may be reduced. Therefore, the content of the elements in the silver oxide is preferably 20% by mass or less, more preferably 15% by mass or less, and particular preferably 13% by mass or less in terms of providing the alkaline secondary battery with a higher capacity. The content of the elements is a value with respect to 100% by mass of the whole silver oxide containing the elements. When two or more types of elements are used, the content of the elements indicates the total amount of these elements.

The silver oxide particles containing the elements can be produced by, e.g., the following method.

An excess amount of alkaline aqueous solution, in which potassium hydroxide or sodium hydroxide is dissolved, is stirred in a reaction vessel. Then, a soluble salt of silver (such as silver nitrate) and soluble salts of the elements (such as chloride, sulfate, nitrate, phosphate, carbonate, and acetate) are dissolved in water to form a mixed solution. The mixed solution is added to the reaction vessel and reacts with the alkaline aqueous solution.

The molar ratio of silver and the elements may be adjusted in accordance with the intended content of the elements in the silver oxide. In order to control the reaction rate, e.g., the alkaline aqueous solution may be cooled or heated to about 40 to 70° C., or an organic solvent (such as alcohol) that is compatible with water may further be added to the alkaline aqueous solution.

Moreover, in order to obtain fine particles by controlling the shape and size of the particles of the reaction product, e.g., gelatin, polyethylene glycol, or polyvinylpyrrolidone may be added as a dispersing agent in an amount of about 0.005 to 5% by mass to the alkaline aqueous solution.

The reaction product thus obtained may be washed with water and dried at about 50 to 300° C. before use. Alternatively, a solution containing the reaction product may be stirred at about 50 to 90° C., and an oxidizing agent (e.g., potassium persulfate, sodium persulfate, potassium permanganate, or sodium hypochlorite) may be added to the solution so that the reaction product is oxidized. Then, the oxidized product may be washed with water and dried in the same manner as described above.

In the present specification, the content of the elements in the silver oxide can be measured by emission spectrochemical analysis using high-frequency induction coupled plasma (ICP).

The particle size of the silver oxide is not particularly limited. The silver oxide preferably has a small average particle size in terms of the charge-discharge cycle characteristics. Specifically, the average particle size of the silver oxide is preferably 15 μm or less, more preferably 5 μm or less, particularly preferably 0.5 μm or less, and most preferably 0.2 μm or less.

The use of the silver oxide with the above particle size improves the utilization rate during charge, and thus makes it easy to obtain a large charge capacity even if an end-of-charge voltage is relatively low. Therefore, the charge-discharge cycle characteristics of the battery can be improved further. Moreover, it is possible to reduce a swell of the battery that can be caused by, e.g., increasing the end-of-charge voltage.

However, if the particle size of the silver oxide is too small, the production and subsequent handling of the silver oxide become difficult. Therefore, the average particle size of the silver oxide is preferably 0.01 μm or more, and more preferably 0.03 μm or more.

In the present specification, the average particle size of the silver oxide means a particle diameter ($D_{50}$) at a cumulative frequency of 50% in the volume-based distribution, which is measured with a laser scattering particle size distribution analyzer (e.g., "LA-920" manufactured by HORIBA, Ltd.) by dispersing the particles in a medium that does not dissolve those particles.

The conductive assistant of the positive electrode may be, e.g., a carbonaceous material such as carbon black or graphite.

The content of the silver oxide in the positive electrode mixture (i.e., a positive electrode mixture molded body or a positive electrode mixture layer) is preferably, e.g., 60% by mass or more, and more preferably 80% by mass or more, and particularly preferably 90% by mass or more in order to ensure the capacity. The content of the conductive assistant in the positive electrode mixture is preferably 0.2% by mass or more, more preferably 0.5% by mass or more, and particularly preferably 1% by mass or more in terms of the conductivity. On the other hand, the content of the conductive assistant in the positive electrode mixture is preferably 7% by mass or less, more preferably 5% by mass or less, and particularly preferably 3% by mass or less in order to prevent a reduction in capacity and the generation of gas during charge.

The positive electrode mixture (i.e., a positive electrode mixture molded body or a positive electrode mixture layer) preferably contains a manganese oxide. When an alkaline secondary battery that includes a positive electrode containing a silver oxide is discharged, silver is produced from the silver oxide. When this battery is charged, crystals of the silver oxide are formed around the silver and may interfere with the subsequent cell reaction. On the other hand, if the positive electrode contains a manganese oxide as well as the silver oxide in the positive electrode mixture, the manganese oxide is dissolved during charge of the battery to produce Mn ions such as manganic acid ions, and the Mn ions are adsorbed by the positive electrode. Therefore, the crystal growth of the silver oxide is suppressed, and crystals of the silver oxide to be formed are made fine. This can reduce the problem of interference with the cell reaction by the crystals of the silver oxide that are formed during charge of the battery, and thus can further improve the charge-discharge cycle characteristics of the battery.

When the positive electrode mixture contains a manganese oxide, the content of the manganese oxide in the positive electrode mixture is preferably 0.3% by mass or more, more preferably 0.7% by mass or more, and particularly preferably 1% by mass or more in terms of favorably ensuring the effect of the manganese oxide. However, if the amount of the manganese oxide in the positive electrode mixture is too large, the capacity of the alkaline secondary battery may be reduced, e.g., because the amount of the silver oxide becomes excessively small. Therefore, the content of the manganese oxide in the positive electrode mixture is preferably 40% by mass or less, more preferably 20% by mass or less, and particularly preferably 10% by mass or less in terms of further increasing the capacity of the alkaline secondary battery.

Examples of the manganese oxide include oxides or double oxides containing Mn such as $Mn_2O_3$, $Mn_3O_4$, MnOOH, $MnO_2$, $ZnMn_2O_4$, and $LiMn_2O_4$. Among them, the manganese oxide in which the average valence of Mn is 3 or more is preferred, and $MnO_2$ is more preferred.

The positive electrode mixture may contain a compound (e.g., an oxide, a sulfide, a chloride, or a sulfate) of at least one element selected from the group consisting of Bi, Pb, Zr, Sn, Mn, Ti, and Se. In other words, the positive electrode mixture may contain the compound of the same element as that contained in the silver oxide particles. This indicates that the positive electrode mixture is expected to have the effect similar to that obtained when the silver oxide particles contain the element.

The positive electrode in the form of a positive electrode mixture molded body can be produced in the following manner. For example, a positive electrode mixture is prepared by mixing a positive electrode active material, a conductive assistant, and optionally a binder, an additive, or an alkaline electrolyte solution. Then, the positive electrode mixture is formed into a predetermined shape by pressure molding.

The positive electrode in the form of a positive electrode mixture layer provided on a substrate such as a current collector can be produced in the following manner. For example, a positive electrode mixture containing composition (slurry paste, etc.) is prepared by dispersing a positive electrode active material, a conductive assistant, and optionally a binder or an additive in water or an organic solvent such as NMP. Then, the positive electrode mixture containing composition is applied to the current collector and dried, which is further subjected to pressing (e.g., calendering) as needed.

However, the method for producing the positive electrode is not limited to the above, and the positive electrode may be produced by other methods.

The thickness of the positive electrode mixture molded body is preferably 0.15 to 4 mm. On the other hand, when the positive electrode includes the positive electrode mixture layer and the current collector, the thickness of the positive electrode mixture layer (per one side of the current collector) is preferably 30 to 300 µm.

The current collector used for the positive electrode may be made of, e.g., stainless steels such as SUS316, SUS430, and SUS444, aluminum, or aluminum alloy. The current collector may be in the form of, e.g., a plain-woven wire mesh, an expanded metal, a lath mesh, a punching metal, a metal foam, or a foil (plate). The thickness of the current collector is preferably, e.g., 0.05 to 0.2 mm. It is also desirable that a paste-like conductive material such as carbon paste or silver paste be applied to the surface of the current collector.

Examples of the alkaline electrolyte solution used in the alkaline secondary battery of the present invention include the following: an alkaline electrolyte solution contained in the separator; an alkaline electrolyte solution contained in the anion conductive membrane; an alkaline electrolyte solution contained in the negative electrode; and an alkaline electrolyte solution used in forming the positive electrode mixture. The alkaline electrolyte solution is preferably an aqueous solution containing one or more types of alkali metal hydroxides (such as sodium hydroxide, potassium hydroxide, and lithium hydroxide). In particular, potassium hydroxide is preferred. When the alkaline electrolyte solution is, e.g., an aqueous solution of potassium hydroxide, the content of potassium hydroxide is preferably 20% by mass or more, and more preferably 30% by mass or more. The content of potassium hydroxide is also preferably 40% by mass or less, and more preferably 38% by mass or less. The concentration of the aqueous solution of potassium hydroxide is adjusted within this range so that the alkaline electrolyte solution can have excellent conductivity.

In addition to the above components, if necessary, the alkaline electrolyte solution may contain various known additives so as not to impair the effects of the present invention. For example, zinc oxide may be added to the alkaline electrolyte solution to prevent corrosion (oxidation) of the zinc-based particles that are used for the negative electrode of the alkaline secondary battery. In this case, zinc oxide also may be added to the negative electrode.

Moreover, at least one selected from the group consisting of a manganese compound, a tin compound, and an indium compound may be dissolved in the alkaline electrolyte solution. When these compounds are dissolved in the alkaline electrolyte solution, ions derived from the compounds (i.e., manganese ions, tin ions, and indium ions) have the effect similar to that of the Mn ions that are eluted from the manganese oxide contained in the positive electrode mixture. Thus, the charge-discharge cycle characteristics of the battery can be improved even further.

The above compounds may be dissolved in any of the following alkaline electrolyte solutions: the alkaline electrolyte solution injected into the battery; the alkaline electrolyte solution contained in the anion conductive membrane; the alkaline electrolyte solution contained in the negative electrode; and the alkaline electrolyte solution used in forming the positive electrode mixture. Alternatively, the compounds may be dissolved in all of these alkaline electrolyte solutions.

Examples of the manganese compound dissolved in the alkaline electrolyte solution include manganese chloride, manganese acetate, manganese sulfide, manganese sulfate, and manganese hydroxide. Examples of the tin compound dissolved in the alkaline electrolyte solution include tin chloride, tin acetate, tin sulfide, tin bromide, tin oxide, tin hydroxide, and tin sulfate. Examples of the iridium compound dissolved in the alkaline electrolyte solution include indium hydroxide, indium oxide, indium sulfate, indium sulfide, indium nitrate, indium bromide, and indium chloride.

The concentrations of the manganese compound, the tin compound, and the indium compound in the alkaline electrolyte solution may be expressed in terms of the ratios of manganese, tin, and indium to the alkaline electrolyte solution, respectively. In such a case, the concentration of each compound is preferably 0.005% by mass (50 ppm) or more, and more preferably 0.05% by mass (500 ppm) or more.

The upper limit of the concentration of each compound (i.e., the ratio of each element) is not particularly limited. However, if the concentration is too high, the compound is likely to be precipitated as an alkali metal salt or the like, and may close the holes of the separator. Therefore, the concentration of each compound is preferably 1% by mass (10000 ppm) or less, and more preferably 0.5% by mass (5000 ppm) or less.

When two or more types of compounds are dissolved in the alkaline electrolyte solution, it is preferable that the total concentration of these compounds falls in the above range.

The ions of the compounds contained in the alkaline electrolyte solution are more easily adsorbed by the silver oxide as the average particle size of the silver oxide becomes smaller. Therefore, in order to achieve a higher utilization rate during charge and to further improve the charge-discharge cycle characteristics of the battery, the average particle size of the silver oxide is preferably, e.g., 1 µm or less.

As described above, the polyalkylene glycols or the calcium compound may be added to the alkaline electrolyte solution as needed, and then incorporated in the negative electrode via the electrolyte solution.

The form of the alkaline secondary battery of the present invention is not particularly limited. The alkaline secondary battery can be in any form such as flat type, laminated type, or tubular type. For example, a flat-type battery (including a coin-type battery and a button-type battery) has a battery case in which an outer can and a sealing plate are joined by caulking via a gasket, or the outer can and the sealing plate are welded to seal the joint between them. A laminated-type battery has an outer package made of a metallic laminated film. A tubular-type battery (including a cylindrical battery and a rectangular (prismatic) battery) has a battery case in which a cylindrical outer can with a bottom and a sealing plate are joined by caulking via a gasket, or the outer can and the sealing plate are welded to seal the joint between them.

When the outer package is sealed by caulking, the gasket arranged between the outer can and the sealing plate may be made of, e.g., PP or nylon. Moreover, when heat resistance is required in relation to the intended use of the battery, the gasket may also be made of heat-resistant resin with a melting point of more than 240° C., including, e.g., a fluorocarbon polymer such as a tetrafluoroethylene-perfluoroalkoxyethylene copolymer (PFA), polyphenylene ether (PEE), polysulfone (PSF), polyarylate (PAR), polyether sulfone (PES), PPS, and PEEK. Further, when the intended use of the battery requires heat resistance, the outer package may be sealed by a glass hermetic seal.

In order to prevent the elution of elements such as iron that constitute the outer can during charge, it is desirable that the inner surface of the outer can is plated with anti-corrosion metal such as gold.

EXAMPLES

Hereinafter, the present invention will be described in detail by way of examples. However, the present invention is not limited to the following examples.

Example 1

<Production of Anion Conductive Membrane>

First, 5 g of a PTFE aqueous dispersion (solid content: 60% by mass), 2.5 g of an aqueous solution of sodium polyacrylate (concentration: 2% by mass), and 2.5 g of hydrotalcite particles (average particle size: 0.4 µm) were kneaded, and then rolled to form a membrane with a thickness of 30 µm. Moreover, the membrane was punched into a circle with a diameter of 9.2 mm, thus providing an anion conductive membrane. The anion conductive membrane was used for the assembly of a battery <Production of Alkaline Secondary Battery>

A positive electrode mixture was prepared by mixing positive electrode active materials, i.e., 93% by mass of silver (I) oxide with an average particle size of 0.3 µm, 5% by mass of manganese dioxide, and 2% by mass of graphite. Then, 325 mg of the positive electrode mixture was filled in a mold and molded under pressure into a disk shape with a diameter of 9.05 mm and a height of 0.93 mm. Thus, a positive electrode mixture molded body was produced.

As a negative electrode active material, mercury-free zinc alloy particles containing additional elements of In (500 ppm), Bi (400 ppm), and Al (10 ppm) were used. The mercury-free zinc alloy particles had been generally used in an alkaline primary battery. The particle size of the zinc alloy particles was determined by the above-described method. Consequently, the average particle size ($D_{50}$) was 120 µm and the proportion of the particles with a particle diameter of 75 µm or less was 25% by mass or less. A composition was prepared by mixing the zinc alloy particles (88 mg) and ZnO so that the mass ratio of ZnO to the zinc alloy particles was 3:100. This composition was used to produce a negative electrode.

An alkaline electrolyte solution was an aqueous solution of potassium hydroxide with a concentration of 35% by mass, in which 5% by mass of zinc oxide was dissolved.

A separator was produced by laminating a graft film (thickness: 30 µm), a cellophane film (thickness: 20 µm), and vinylon-rayon mixed paper (thickness: 200 µm), and punching the laminated body into a circle with a diameter of 9.2 mm. The graft film was composed of a graft copolymer obtained by graft copolymerization of acrylic acid with a polyethylene main chain.

Figure 2:
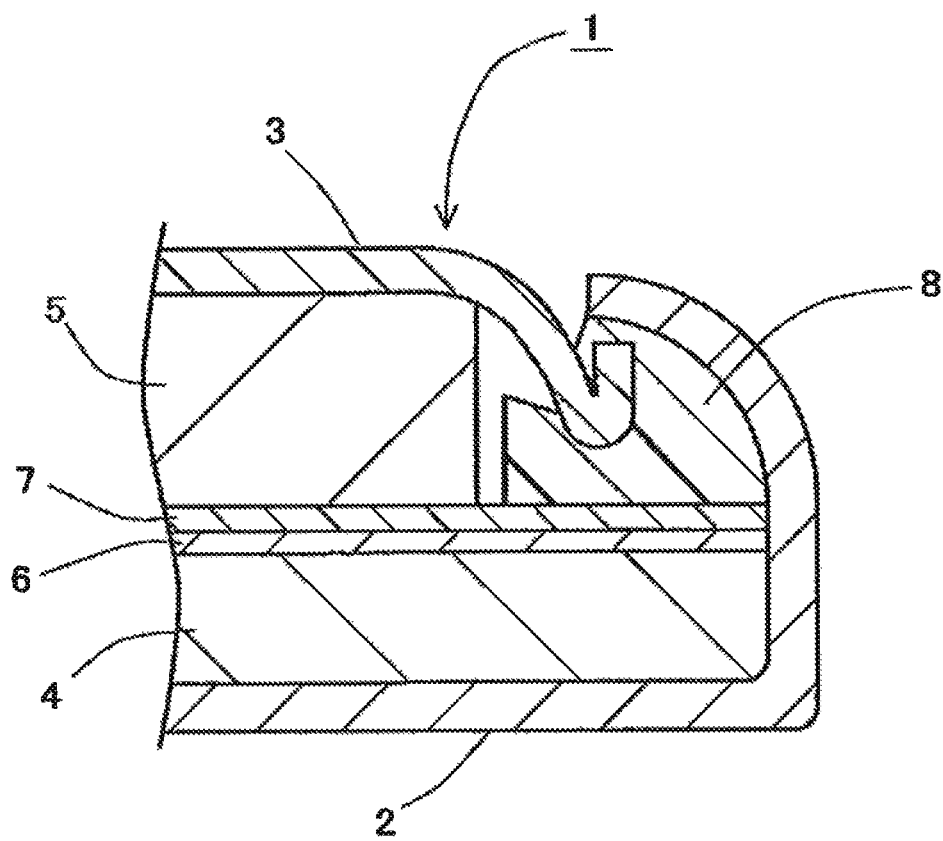
FIG. 2 is a cross-sectional view illustrating the main components of the alkaline secondary battery in FIG. 1.

The positive electrode (positive electrode mixture molded body), the negative electrode, the alkaline electrolyte solution, the anion conductive membrane, and the separator were sealed in a battery container. The battery container included an outer can, a sealing plate, and an annular gasket. The outer can was made of a steel plate and had a gold-plated inner surface. The sealing plate was made of a clad plate of copper, stainless steel (SUS304), and nickel. The annular gasket was made of nylon 66. Thus, an alkaline secondary battery with a diameter of 9.5 mm and a thickness of 3.6 mm was produced. FIGS. 1 and 2 show the appearance and structure of the alkaline secondary battery, respectively. The anion conductive membrane was provided to face the negative electrode. The separator was provided on the positive electrode.

In the alkaline secondary battery 1 as shown in FIGS. 1 and 2, the positive electrode 4, the separator 6, and the anion conductive membrane 7 are provided in the outer can 2. The negative electrode 5 is provided in the sealing plate 3. The sealing plate 3 is fitted into the opening of the outer can 2 via the annular gasket (i.e., the resin gasket) 8 having an L-shaped cross section. The opening edge of the outer can 2 is tightened inward, which brings the resin gasket 8 into contact with the sealing plate 3. Thus, the opening of the outer can 2 is sealed to form a closed structure in the battery. In other words, the alkaline secondary battery 1 as shown in FIGS. 1 and 2 is configured such that power generation components, including the positive electrode 4, the negative electrode 5, the separator 6, and the anion conductive membrane 7, are placed in the space (closed space) of the battery container, which includes the outer can 2, the sealing plate 3, and the resin gasket 8. Moreover, an alkaline electrolyte solution (not shown) is injected into the space and held by the separator 6. The outer can 2 also serves as a positive electrode terminal, and the sealing plate 3 also serves as a negative electrode terminal. As described above, the positive electrode 4 is the positive electrode mixture molded body containing silver (I) oxide, manganese dioxide, and graphite (i.e., a conductive assistant).

Examples 2 to 7

Alkaline secondary batteries were produced in the same manner as Example 1 except that the thickness of the anion conductive membrane was changed as shown in Table 1.

TABLE 1

| | Thickness of anion conductive membrane (μm) |
|---|---|
| Example 1 | 30 |
| Example 2 | 50 |
| Example 3 | 80 |
| Example 4 | 120 |
| Example 5 | 150 |
| Example 6 | 200 |
| Example 7 | 300 |

Comparative Example 1

An alkaline secondary battery was produced in the same manner as Example 1 except that the anion conductive membrane was provided to face the positive electrode, and the separator was provided on the negative electrode.

Comparative Example 2

An alkaline secondary battery was produced in the same manner as Example 1 except that the anion conductive membrane was not used, and only the separator was interposed between the positive electrode and the negative electrode.

The following charge-discharge cycle characteristics tests were performed on the alkaline secondary batteries in Examples 1 to 7 and Comparative Examples 1 to 2. Using 10 batteries for each example, a battery was subjected to constant-current and constant-voltage charge (total charging time: 24 hours). Specifically, the battery was first charged with a constant current of 5 mA until a battery voltage reached 1.85 V, and then charged with a constant voltage of 1.85 V. Subsequently, the battery was connected to a load resistance of 1 kΩ and discharged (discharge cutoff voltage: 1.0 V). This charge-discharge cycle was repeated 100 times, and a discharge capacity was measured in the 1st cycle and the 100th cycle. The ratio of the discharge capacity in the 100th cycle to the discharge capacity in the 1st cycle was determined. Table 2 shows the average of the ratios of 10 batteries as a capacity retention rate. Table 2 also shows the number of batteries that caused an internal short circuit during the charge-discharge cycles.

TABLE 2

| | Charge-discharge cycle characteristics | |
|---|---|---|
| | Capacity retention rate (%) | Number of batteries caused internal short circuit (per 10 batteries) |
| Example 1 | 20 | 3 |
| Example 2 | 50 | 0 |
| Example 3 | 70 | 0 |
| Example 4 | 70 | 0 |
| Example 5 | 69 | 0 |
| Example 6 | 60 | 0 |
| Example 7 | 50 | 0 |
| Comparative Example 1 | 12 | 5 |
| Comparative Example 2 | 10 | 6 |

As shown in Table 2, the batteries in Examples 1 to 7, in which the anion conductive membrane was provided to face the negative electrode, had a high capacity retention rate and reduced the internal short circuit during the charge-discharge cycles, as compared to the battery in Comparative Example 1, in which the anion conductive membrane was provided to face the positive electrode, and the battery in Comparative Example 2, in which the anion conductive membrane was not used. In particular, the batteries in Examples 2 to 7, in which the thickness of the anion conductive membrane was 40 μm or more, had superior properties to the battery in Example 1, in which the thickness of the anion conductive membrane was less than 40 μm.

Example 8

An alkaline secondary battery was produced in the same manner as Example 3 except that ZnO, indium hydroxide, and the zinc alloy particles were mixed at the mass ratio of 3:0.3:100 to form the negative electrode.

Using the batteries in Examples 3 and 8, the charge-discharge cycle was repeated 10 times under the same conditions as those of the charge-discharge cycle characteristics tests. Thereafter, the batteries were stored in an environment of 60° C. for 20 days. Then, changes in the thickness of each of the batteries before and after the storage were measured. Table 3 shows the measurement results.

TABLE 3

| | Change in thickness of battery (mm) |
|---|---|
| Example 3 | 0.15 |
| Example 8 | 0.01 |

As shown in Table 3, the addition of the indium compound to the negative electrode suppressed the generation of gas from the negative electrode, so that changes in the thickness of the battery was reduced.

Example 9

<Production of Anion Conductive Membrane>

An anion conductive membrane with a thickness of 100 μm was produced in the same manner as Example 1. The anion conductive membrane was punched into a circle with the same size as that in Example 1 and used for the assembly of a battery.

<Production of Alkaline Secondary Battery>

A positive electrode mixture was prepared by mixing positive electrode active materials, i.e., 95% by mass of silver (I) oxide powder containing Bi in the particles, 2.5 parts by mass of manganese dioxide, and 2.5% by mass of graphite. The silver (I) oxide powder had an average particle size of 10 μm. The content of Bi in the silver (I) oxide was 9% by mass, which was determined by the above method. Then, 110 mg of the positive electrode mixture was filled in a mold at a density of 5.7 g/cm$^3$ and molded under pressure into a disk shape with a diameter of 9.05 mm and a height of 0.3 mm. Thus, a positive electrode mixture molded body was produced.

As a negative electrode active material, the same mercury-free zinc alloy particles as those of Example 1 were used. A composition for forming a negative electrode (i.e., a negative electrode composition) was prepared by mixing 96 parts by mass of the zinc alloy particles and 4 parts by mass of ZnO. This composition was used in an amount of 28 mg to produce a negative electrode.

An alkaline electrolyte solution was an aqueous solution of potassium hydroxide with a concentration of 35% by mass, in which 5% by mass of zinc oxide was dissolved. The alkaline electrolyte solution was introduced during the production of a battery.

A separator was produced in the following manner. A cellophane film with a thickness of 20 μm was sandwiched between graft films, each of which had a thickness of 30 μm. The graft film was composed of a graft copolymer obtained by graft copolymerization of acrylic acid with a polyethylene main chain. This multilayer film and vinylon-rayon mixed paper (i.e., an electrolyte holding layer) with a thickness of 100 μm were each punched into a circle with a diameter of 9.2 mm, and then were laminated together.

The positive electrode (positive electrode mixture molded body), the negative electrode, the alkaline electrolyte solution, the separator, and the anion conductive membrane were sealed in a battery container. The battery container included an outer can, a sealing plate, and an annular gasket. The outer can was made of a steel plate and had a gold-plated surface. The sealing plate was made of a clad plate of copper, stainless steel (SUS304), and nickel. The annular gasket was made of nylon 66. Thus, an alkaline secondary battery with a diameter of 9.5 mm and a thickness of 1.4 mm was produced. FIGS. 1 and 2 show the appearance and structure of the alkaline secondary battery, respectively. The anion conductive membrane was provided to face the negative electrode.

Examples 10 to 16

Alkaline secondary batteries were produced in the same manner as Example 9 except that the silver oxide powder containing the elements shown in Table 4 was used as a positive electrode active material.

Example 17

An alkaline secondary battery was produced in the same manner as Example 9 except that silver oxide powder containing no additional element was used as a positive electrode active material.

The following charge-discharge cycle characteristics tests were performed on the alkaline secondary batteries in Examples 9 to 17. Using 10 batteries for each example, a battery was subjected to constant-current and constant-voltage charge (total charging time: 24 hours). Specifically, the battery was first charged with a constant current of 5 mA until a battery voltage reached 1.85 V, and then charged with a constant voltage of 1.85 V. Subsequently, the battery was discharged with a constant current of 2 mA (discharge cutoff voltage: 1.0 V). This charge-discharge cycle was repeated 100 times, and a discharge capacity was measured in the 1st cycle and the 100th cycle. The ratio of the discharge capacity in the 100th cycle to the discharge capacity in the 1st cycle was determined. Table 4 shows the average of the ratios of 10 batteries as a capacity retention rate.

TABLE 4

|  | Element contained in silver oxide particles | Capacity retention rate (%) |
|---|---|---|
| Example 9 | Bi | 80 |
| Example 10 | Pb | 79 |
| Example 11 | Zr | 79 |
| Example 12 | Sn | 78 |
| Example 13 | Mn | 76 |
| Example 14 | Ti | 75 |
| Example 15 | Cu | 43 |
| Example 16 | Al | 45 |
| Example 17 | None | 45 |

As shown in Table 4, each of the alkaline secondary batteries in Examples 9 to 14, in which the silver oxide powder contained a particular element in the particles, significantly improved the capacity retention rate and had more excellent charge-discharge cycle characteristics, as compared to the alkaline secondary batteries in Examples 15 and 16, in which the silver oxide powder contained an element other than the elements used in Examples 9 to 14, and the alkaline secondary battery in Example 17, in which the silver oxide powder contained no additional element.

Examples 18 to 22

Alkaline secondary batteries were produced in the same manner as Example 9 except that the content of Bi in the particles of the silver oxide powder was changed as shown in Table 5.

The charge-discharge cycle characteristics tests were performed on the alkaline secondary batteries in Examples 18 to 22 in the same manner as, e.g., Example 9. Table 5 shows the results along with the results of Examples 9 and 17. In Table 5, the data are listed in the order of the amount of Bi.

TABLE 5

|  | Content of Bi (% by mass) | Capacity retention rate (%) |
|---|---|---|
| Example 17 | 0 | 45 |
| Example 23 | 0.2 | 45 |
| Example 18 | 0.5 | 55 |
| Example 19 | 2 | 65 |
| Example 20 | 4 | 77 |
| Example 9 | 9 | 80 |
| Example 21 | 12 | 74 |
| Example 22 | 15 | 55 |
| Example 24 | 25 | 35 |

As shown in Table 5, each of the alkaline secondary batteries in Examples 9 and 18 to 22, in which the content of Bi was 0.3 to 20% by mass, significantly improved the capacity retention rate and had more excellent charge-discharge cycle characteristics, as compared to the alkaline secondary batteries in Examples 17, 23 and 24, in which the content of Bi was outside the above range. In particular, the alkaline secondary batteries in Examples 9 and 19 to 21, in which the content of Bi was 2 to 13% by mass, had remarkably excellent characteristics.

Example 25

A positive electrode mixture molded body was produced in the same manner as Example 9 except that the silver (I) oxide had an average particle size of 0.3 μm.

An alkaline electrolyte solution was an aqueous solution of potassium hydroxide (concentration: 35% by mass), in which 3% by mass of zinc oxide was dissolved, and further PEG 600 (polyethylene glycol with an average molecular weight of 600) was added at a concentration of 1% by mass.

An alkaline secondary battery with a diameter of 9.5 mm and a thickness of 1.4 mm was produced in the same manner as Example 9 except that the above positive electrode (positive electrode mixture molded body) and the above alkaline electrolyte solution were used.

Example 26

A composition for forming a negative electrode (i.e., a negative electrode composition) was prepared by mixing 95.7 parts by mass of the zinc alloy particles, 4 parts by mass of ZnO, and 0.3 parts by mass of indium hydroxide. An alkaline secondary battery was produced in the same manner as Example 25 except that the above composition was used.

Example 27

An alkaline electrolyte solution was an aqueous solution of potassium hydroxide (concentration: 35% by mass), in which 3% by mass of zinc oxide was dissolved, and further PEG 600 (polyethylene glycol with an average molecular weight of 600) was added at a concentration of 10% by mass. An alkaline secondary battery was produced in the same manner as Example 25 except that the above alkaline electrolyte solution was used.

Example 28

An alkaline electrolyte solution was an aqueous solution of potassium hydroxide (concentration: 35% by mass), in which 3% by mass of zinc oxide was dissolved, but no polyethylene glycol was added. An alkaline secondary battery was produced in the same manner as Example 25 except that the above alkaline electrolyte solution was used.

Example 29

An alkaline secondary battery was produced in the same manner as Example 25 except that the concentration of polyethylene glycol in the alkaline electrolyte solution was 20% by mass.

The following charge-discharge cycle characteristics evaluation, storage characteristics evaluation, and discharge characteristics evaluation were performed on the alkaline secondary batteries in Examples 25 to 29.

<Charge-Discharge Cycle Characteristics Evaluation>

In each of the alkaline secondary batteries in Examples 25 to 29, assuming that the capacity of the silver oxide in the positive electrode was 231 mAh/g, a theoretical capacity of the whole positive electrode was determined Then, each battery was charged at 4 mA (charge cutoff voltage: 1.85 V) and discharged at 1 mA (discharge cutoff voltage: 1.0 V), and the discharge was terminated when the quantity of electricity was 40% of the theoretical capacity. This charge-discharge cycle was repeated 300 times, and a discharge capacity was measured in the 100th cycle, the 200th cycle, and the 300th cycle. In Example 25, the discharge capacity of the battery in the 1st cycle was set to 100. Using this value as a reference, the discharge capacity of the individual alkaline secondary batteries for each cycle was expressed as a relative value (capacity retention rate) with respect to the reference value. Thus, the charge-discharge cycle characteristics were evaluated.

<Storage Characteristics Evaluation>

Using the alkaline secondary batteries in Examples 25 to 29, the charge-discharge cycle was repeated 5 times under the same conditions as those of the charge-discharge cycle characteristics evaluation. After the charge was finished in the 6th cycle, the batteries were stored in an environment of 60° C. for 20 days. Then, an increase in the thickness of each of the batteries before and after the storage was measured. Thus, the storage characteristics were evaluated.

<Discharge Characteristics Evaluation>

Each of the batteries was charged with a charge current of 4 mA until a battery voltage reached 1.85V, and then discharged with a current of 10 mA. A difference (voltage reduction) between the battery voltage after 0.1 seconds from the start of the discharge and the battery voltage before the start of the discharge was measured. Thus, the discharge characteristics were evaluated.

Tables 6 and 7 show the evaluation results.

TABLE 6

| | Charge-discharge cycle characteristics Capacity retention rate (%) | | | |
|---|---|---|---|---|
| | 1st cycle | 100th cycle | 200th cycle | 300th cycle |
| Example 25 | 100 | 100 | 90 | 78 |
| Example 26 | 100 | 100 | 94 | 80 |
| Example 27 | 100 | 99 | 89 | 77 |
| Example 28 | 100 | 90 | 60 | 20 |
| Example 29 | 80 | 70 | 70 | 60 |

TABLE 7

| | Storage characteristics Increase in thickness after storage at 60° C. for 20 days (mm) | Discharge characteristics Voltage reduction during discharge (mV) |
|---|---|---|
| Example 25 | 0.05 | 150 |
| Example 26 | 0.03 | 150 |
| Example 27 | 0.05 | 200 |
| Example 28 | 0.15 | 150 |
| Example 29 | 0.05 | 400 |

As shown in Tables 6 and 7, the alkaline secondary batteries in Examples 25 to 27, in which the alkaline electrolyte solution contained a relatively small amount of polyalkylene glycols, were superior in the charge-discharge cycle characteristics, the storage characteristics, and the discharge characteristics. In particular, the alkaline secondary battery in Example 26, in which the negative electrode contained indium hydroxide, effectively suppressed the generation of gas and further reduced an increase in the thickness of the battery during high temperature storage.

On the other hand, the alkaline secondary battery in Example 28, in which the alkaline electrolyte solution did not contain polyalkylene glycols, was inferior to the batteries in Examples 25 to 27 in the charge-discharge cycle characteristics and the storage characteristics. The alkaline secondary battery in Example 29, in which the content of polyalkylene glycols in the alkaline electrolyte solution was increased, suppressed a decrease in the discharge capacity with the progress of the charge-discharge cycle, and also reduced an increase in the thickness of the battery during high temperature storage, as compared to the battery in Example 28. However, the alkaline secondary battery in Example 29 was inferior to the batteries in Examples 25 to 27 in the discharge characteristics because the discharge capacity was low from the beginning of the charge-discharge cycle, and the voltage was greatly reduced at the start of the discharge in Example 29.

Example 30

A composition for forming a negative electrode (i.e., a negative electrode composition) was prepared by mixing the same zinc alloy particles as those of Example 1, calcium hydroxide, and ZnO at the ratio (mass ratio) of 94:3:3. Then, 28 mg of the composition was used to form a negative electrode. Thus, the amount of calcium hydroxide in an alkaline secondary battery in Example 30 was 3.2 parts by mass with respect to 100 parts by mass of the zinc alloy particles.

An alkaline electrolyte solution was an aqueous solution of potassium hydroxide (concentration: 35% by mass), in which 3% by mass of zinc oxide was dissolved.

An alkaline secondary battery with a diameter of 9.5 mm and a thickness of 1.4 mm was produced in the same manner as Example 25 except that the above negative electrode (negative electrode composition) and the above alkaline electrolyte solution were used.

Example 31

An alkaline secondary battery was produced in the same manner as Example 30 except that the negative electrode composition contained the zinc alloy particles, calcium hydroxide, and ZnO at the mass ratio of 92:5:3 (i.e., the amount of calcium hydroxide was 5.4 parts by mass with respect to 100 parts by mass of the zinc alloy particles).

Example 32

An alkaline secondary battery was produced in the same manner as Example 30 except that the negative electrode composition contained the zinc alloy particles, calcium hydroxide, and ZnO at the mass ratio of 87:10:3 (i.e., the amount of calcium hydroxide was 11.5 parts by mass with respect to 100 parts by mass of the zinc alloy particles).

Example 33

An alkaline secondary battery was produced in the same manner as Example 30 except that the negative electrode composition contained the zinc alloy particles, calcium hydroxide, and ZnO at the mass ratio of 77:20:3 (i.e., the amount of calcium hydroxide was 26.0 parts by mass with respect to 100 parts by mass of the zinc alloy particles).

Example 34

An alkaline secondary battery was produced in the same manner as Example 30 except that the negative electrode composition contained the zinc alloy particles, calcium hydroxide, and ZnO at the mass ratio of 67:30:3 (i.e., the amount of calcium hydroxide was 44.8 parts by mass with respect to 100 parts by mass of the zinc alloy particles).

Example 35

An alkaline secondary battery was produced in the same manner as Example 30 except that the negative electrode composition contained the zinc alloy particles, calcium hydroxide, and ZnO at the mass ratio of 57:40:3 (i.e., the amount of calcium hydroxide was 70.2 parts by mass with respect to 100 parts by mass of the zinc alloy particles).

Example 36

An alkaline secondary battery was produced in the same manner as Example 30 except that the negative electrode composition contained the zinc alloy particles, calcium hydroxide, and ZnO at the mass ratio of 97:0:3 (i.e., the amount of calcium hydroxide was 0 parts by mass with respect to 100 parts by mass of the zinc alloy particles).

The discharge characteristics evaluation and the charge-discharge cycle characteristics evaluation were performed on the alkaline secondary batteries in Examples 30 to 36 in the following manner.

In each of the alkaline secondary batteries in Examples 30 to 36, assuming that the capacity of the silver oxide in the positive electrode was 231 mAh/g, a theoretical capacity of the whole positive electrode was determined. Then, each battery was charged at 4 mA (charge cutoff voltage: 1.85 V) and discharged at 1 mA (discharge cutoff voltage: 1.0 V), and the discharge was terminated when the quantity of electricity was 35% of the theoretical capacity. This charge-discharge cycle was repeated 300 times, and a discharge capacity was measured in the 1st cycle and the 300th cycle. In Example 36, the discharge capacity of the alkaline secondary battery in the 1st cycle was set to 100. Using this value as a reference, the discharge capacity of the individual alkaline secondary batteries for each cycle was expressed as a relative value (percentage) with respect to the reference value. The discharge characteristics (initial discharge characteristics) were evaluated by the ratio in the 1st cycle. The charge-discharge cycle characteristics were evaluated by the ratio in the 300th cycle.

Table 8 shows the results of the evaluations. In Table 8, the "amount of calcium hydroxide" means the amount (parts by mass) of calcium hydroxide with respect to 100 parts by mass of the zinc alloy particles (the same is true for the following Table 11).

TABLE 8

|  | Amount of calcium hydroxide (parts by mass) | Initial discharge characteristics (%) | Charge-discharge cycle characteristics (%) |
| --- | --- | --- | --- |
| Example 30 | 3.2 | 100 | 30 |
| Example 31 | 5.4 | 100 | 60 |
| Example 32 | 11.5 | 100 | 75 |
| Example 33 | 26.0 | 95 | 72 |
| Example 34 | 44.8 | 70 | 60 |
| Example 35 | 70.2 | 55 | 40 |
| Example 36 | 0 | 100 | 20 |

As shown in Table 8, the alkaline secondary batteries in Examples 30 to 35, in which the negative electrode contained calcium hydroxide (i.e., a calcium compound), and a particular anion conductive membrane was disposed between the positive electrode and the negative electrode, had more excellent charge-discharge cycle characteristics, as compared to the battery in Example 36, in which the negative electrode did not contain calcium hydroxide. In particular, the batteries in Examples 31 to 33, in which the amount of calcium hydroxide with respect to the zinc alloy particles was more appropriate, had a good balance between the initial discharge characteristics and the charge-discharge cycle characteristics.

Example 37

A composition for forming a negative electrode (i.e., a negative electrode composition) was prepared by mixing the same zinc alloy particles as those of Example 1, ZnO, and polyethylene glycol with an average molecular weight of 600 (PEG 600) at the mass ratio of 96:4:0.48 (i.e., the amount of polyethylene glycol was 0.5 parts by mass with respect to 100 parts by mass of the zinc alloy particles).

An alkaline secondary battery was produced in the same manner as Example 28 except that 28 mg of the above negative electrode composition was used to form a negative electrode.

Example 38

An alkaline secondary battery was produced in the same manner as Example 37 except that the negative electrode composition contained 95.7 parts by mass of the zinc alloy particles, 4 parts by mass of ZnO, 4.785 parts by mass of PEG 600 (i.e., the amount of polyethylene glycol was 5 parts by mass with respect to 100 parts by mass of the zinc alloy particles), and 0.3 parts by mass of indium hydroxide.

Example 39

An alkaline secondary battery was produced in the same manner as Example 37 except that the negative electrode composition contained 96 parts by mass of the zinc alloy particles, 4 parts by mass of ZnO, and 4.8 parts by mass of PEG 600 (i.e., the amount of polyethylene glycol was 5 parts by mass with respect to 100 parts by mass of the zinc alloy particles).

The charge-discharge cycle characteristics, the storage characteristics, and the discharge characteristics of the alkaline secondary batteries in Examples 37 to 39 were evaluated in the same manner as, e.g., Example 25. Tables 9 and 10 show the results along with the results of Example 28. In Table 9, the amount of "PEG" means the amount (parts by mass) of polyethylene glycol (PEG 600) with respect to 100 parts by mass of the zinc alloy powder (the same is true for the following Table 11). The capacity retention rate in each cycle was expressed as a relative value with respect to the discharge capacity of the battery in the 1st cycle in Example 28, which was set to 100.

TABLE 9

|  | Amount of PEG (parts by mass) | Charge-discharge cycle characteristics Capacity retention rate (%) | | | |
| --- | --- | --- | --- | --- | --- |
|  |  | 1st cycle | 100th cycle | 200th cycle | 300th cycle |
| Example 28 | 0 | 100 | 90 | 60 | 20 |
| Example 37 | 0.5 | 100 | 100 | 90 | 78 |
| Example 38 | 5 | 100 | 100 | 94 | 80 |
| Example 39 | 5 | 100 | 99 | 89 | 77 |

TABLE 10

|  | Storage characteristics Increase in thickness after storage at 60° C. for 20 days (mm) | Discharge characteristics Voltage reduction during discharge (mV) |
| --- | --- | --- |
| Example 28 | 0.15 | 150 |
| Example 37 | 0.05 | 150 |
| Example 38 | 0.03 | 150 |
| Example 39 | 0.05 | 200 |

As shown in Tables 9 and 10, the alkaline secondary batteries in Examples 37 to 39, in which the negative electrode contained a relatively small amount of polyalkylene glycols, were superior in the charge-discharge cycle characteristics, the storage characteristics, and the discharge characteristics. In particular, the alkaline secondary battery in Example 38, in which the negative electrode contained indium hydroxide, effectively suppressed the generation of gas and further reduced an increase in the thickness of the battery during high temperature storage.

On the other hand, the alkaline secondary battery in Example 28, in which the negative electrode did not contain polyalkylene glycols, was inferior to the batteries in Examples 37 to 39 in the charge-discharge cycle characteristics and the storage characteristics.

Example 40

A composition for forming a negative electrode (i.e., a negative electrode composition) was prepared by mixing the same zinc alloy particles as those in Example 1, calcium hydroxide, ZnO, and polyethylene glycol with an average molecular weight of 600 (PEG 600) at the mass ratio of 87:10:3:0.1 (i.e., the amount of polyethylene glycol was 0.12 parts by mass with respect to 100 parts by mass of the zinc alloy particles).

An alkaline secondary battery was produced in the same manner as Example 30 except that 28 mg of the above negative electrode composition was used to form a negative electrode.

Examples 41 to 46

Alkaline secondary batteries were produced in the same manner as Example 40 except that the amount of PEG 600 with respect to 100 parts by mass of the zinc alloy particles was changed as shown in Table 11.

The discharge characteristics (initial discharge characteristics) and the charge-discharge cycle characteristics of the alkaline secondary batteries in Examples 40 to 46 were evaluated in the same manner as, e.g., Example 30. Table 11 shows the results along with the results of Example 32. In Table 11, the data are listed in the order of the amount of PEG 600. The initial discharge characteristics and the charge-discharge cycle characteristics of each of the batteries were calculated based on the discharge capacity of the battery in the 1st cycle in Example 32, which was set to 100.

TABLE 11

| | Amount of calcium hydroxide (parts by mass) | Amount of PEG (parts by mass) | Initial discharge characteristics (%) | Charge-discharge cycle characteristics (%) |
|---|---|---|---|---|
| Example 32 | 11.5 | 0 | 100 | 75 |
| Example 41 | 11.5 | 0.06 | 100 | 77 |
| Example 40 | 11.5 | 0.12 | 100 | 85 |
| Example 42 | 11.5 | 0.35 | 100 | 82 |
| Example 43 | 11.5 | 0.58 | 97 | 78 |
| Example 44 | 11.5 | 1.15 | 95 | 75 |
| Example 45 | 11.5 | 2.30 | 90 | 70 |
| Example 46 | 11.5 | 5.75 | 70 | 60 |

As shown in Table 11, the alkaline secondary batteries in Examples 40 to 43, in which the negative electrode contained a relatively small amount of polyalkylene glycols, had more excellent charge-discharge cycle characteristics, as compared to the battery in Example 32, in which the negative electrode did not contain polyalkylene glycols. In particular, the batteries in Examples 40 to 42, in which the amount of PEG 600 with respect to the zinc alloy particles was more appropriate, had a good balance between the initial discharge characteristics and the charge-discharge cycle characteristics.

Reference Example 1

A positive electrode mixture was prepared by mixing positive electrode active materials, i.e., 97.5 parts by mass of silver (I) oxide with an average particle size of 10 µm, 0.5 parts by mass of manganese dioxide with an average particle size of 30 and 2 parts by mass of graphite. Then, the positive electrode mixture was filled in a mold at a density of 5.5 g/cm³ and molded under pressure into a disk shape with a diameter of 9.05 mm and a height of 0.93 mm. Thus, a positive electrode mixture molded body was produced.

An alkaline secondary battery with a diameter of 9.5 mm and a thickness of 3.6 mm was produced in the same manner as Example 1 except that the above positive electrode (positive electrode mixture molded body) was used, the outer can was made of an Ni-plated steel plate, the negative electrode was formed using 88 mg of the zinc alloy particles that were the same as those of Example 1, and only the separator (and not the anion conductive membrane) was interposed between the positive electrode and the negative electrode.

Reference Examples 2 to 9

Alkaline secondary batteries were produced in the same manner as Reference Example 1 except that the contents of silver (I) oxide and manganese dioxide were changed as shown in Table 12.

Table 12 shows the content of each component in the positive electrode mixture (positive electrode mixture molded body) of the individual alkaline secondary batteries in Reference Examples 1 to 9.

TABLE 12

| | Content in positive electrode mixture (% by mass) | | |
|---|---|---|---|
| | $MnO_2$ | Silver (I) oxide | Graphite |
| Reference Example 1 | 0.5 | 97.5 | 2 |
| Reference Example 2 | 1 | 97 | 2 |

TABLE 12-continued

| | Content in positive electrode mixture (% by mass) | | |
|---|---|---|---|
| | $MnO_2$ | Silver (I) oxide | Graphite |
| Reference Example 3 | 5 | 93 | 2 |
| Reference Example 4 | 10 | 88 | 2 |
| Reference Example 5 | 20 | 78 | 2 |
| Reference Example 6 | 30 | 68 | 2 |
| Reference Example 7 | 0 | 98 | 2 |
| Reference Example 8 | 0.2 | 97.8 | 2 |
| Reference Example 9 | 50 | 48 | 2 |

The charge-discharge cycle characteristics evaluation was performed on the alkaline secondary batteries in Reference Examples 1 to 9 in the same manner as, e.g., Example 1. Table 13 shows the discharge capacity of each battery in the 1st cycle and the 100th cycle, and the ratio of the discharge capacity in the 100th cycle to the discharge capacity in the 1st cycle (i.e., a capacity retention rate).

TABLE 13

| | Discharge capacity (mAh) | | Capacity retention rate (%) |
|---|---|---|---|
| | 1st cycle | 100th cycle | |
| Reference Example 1 | 40 | 13 | 33 |
| Reference Example 2 | 39 | 16 | 41 |
| Reference Example 3 | 38 | 16 | 42 |
| Reference Example 4 | 36 | 16 | 44 |
| Reference Example 5 | 32 | 14 | 44 |
| Reference Example 6 | 28 | 13 | 46 |
| Reference Example 7 | 40 | 8 | 20 |
| Reference Example 8 | 40 | 9 | 23 |
| Reference Example 9 | 20 | 8 | 40 |

As shown in Table 13, the batteries in Reference Examples 1 to 6, in which the content of manganese dioxide in the positive electrode mixture was 0.5 to 30% by mass, had a discharge capacity of about 30 mAh or more in the 1st cycle, and also had a high capacity retention rate of 30% or more after 100 cycles. In particular, the batteries in Reference Examples 2 to 4, in which the content of manganese dioxide was 1 to 10% by mass, sufficiently achieved the effect of the addition of manganese dioxide, suppressed a decrease in the discharge capacity due to the addition of manganese dioxide, and had a higher capacity and more excellent cycle characteristics.

Reference Examples 10 to 14

Alkaline secondary batteries were produced in the same manner as Reference Example 3 except that the silver (I)

oxide with an average particle size shown in Table 14 was used as a positive electrode active material.

Using each of the batteries in Reference Examples 10 to 14, the charge-discharge cycle was repeated 100 times under the same conditions as those of, e.g., Reference Example 1, and the same measurement were performed.

Table 14 shows the average particle size of the silver (I) oxide in the positive electrode mixture and the test results of each of the alkaline secondary batteries in Reference Examples 10 to 14. Table 14 also shows the average particle size of the silver (I) oxide in the positive electrode mixture and the results of the charge-discharge cycle characteristics test of the battery in Reference Example 3.

TABLE 14

| | Average particle size of silver (I) oxide (μm) | Discharge capacity (mAh) | | Capacity retention rate (%) |
|---|---|---|---|---|
| | | 1st cycle | 100th cycle | |
| Reference Example 3 | 10 | 38 | 16 | 42 |
| Reference Example 10 | 2 | 38 | 16 | 42 |
| Reference Example 11 | 0.6 | 38 | 18 | 47 |
| Reference Example 12 | 0.3 | 38 | 22 | 58 |
| Reference Example 13 | 0.15 | 38 | 26 | 68 |
| Reference Example 14 | 0.07 | 38 | 25 | 66 |

As shown in Table 14, the batteries in Reference Examples 12 to 14, in which the average particle size of the silver oxide was 0.5 μm or less, had a higher capacity retention rate and more excellent charge-discharge cycle characteristics, as compared to the batteries in Reference Examples 3, 10, and 11, in which the average particle size of the silver oxide was more than 0.5 μm. In particular, the batteries in Reference Examples 13 and 14, in which the average particle size of the silver oxide was 0.2 μm or less, were able to further improve the capacity retention rate.

The results shown in Tables 13 and 14 were derived from the alkaline secondary batteries that did not include an anion conductive membrane. However, the results indicate that when the configuration of the positive electrode of each of the batteries in Reference Examples 1 to 6 and 10 to 14 is used in the alkaline secondary battery that includes an anion conductive membrane, it can be expected that the charge-discharge cycle characteristics will be improved, as confirmed by the comparison between the batteries in these Reference Examples and the batteries in Reference Examples 7 to 9.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes that come within the meaning and range of equivalency of the claims are intended to be embraced therein.

INDUSTRIAL APPLICABILITY

The alkaline secondary battery of the present invention could find applications for which alkaline primary batteries (silver oxide primary batteries) have been used, and also find application for which conventionally known alkaline secondary batteries or non-aqueous electrolyte secondary batteries have been used.

DESCRIPTION OF REFERENCE NUMERALS

1 Alkaline secondary battery
2 Outer can
3 Sealing plate
4 Positive electrode (positive electrode mixture molded body)
5 Negative electrode
6 Separator
7 Anion conductive membrane
8 Gasket

The invention claimed is:

1. An alkaline secondary battery comprising:
a positive electrode;
a negative electrode;
a separator interposed between the positive electrode and the negative electrode; and
a battery case;
wherein the positive electrode contains a silver oxide,
the silver oxide contains at least one element selected from the group consisting of Bi, Pb, Zr, Sn, Mn, and Ti in particles in an amount of 0.3 to 15% by mass,
the negative electrode contains zinc-based particles selected from the group consisting of zinc particles and zinc alloy particles,
the separator holds an alkaline electrolyte solution, and
an anion conductive membrane is disposed between the negative electrode and the separator, the anion conductive membrane including a polymer as a matrix and particles of at least one metal compound selected from the group consisting of metal oxides, metal hydroxides, metal carbonates, metal sulfates, metal phosphates, metal borates, and metal silicates, which are dispersed in the matrix.

2. The alkaline secondary battery according to claim 1, wherein the negative electrode contains polyalkylene glycols.

3. The alkaline secondary battery according to claim 1, wherein a surface of the zinc-based particles is coated with polyalkylene glycols.

4. The alkaline secondary battery according to claim 1, wherein the negative electrode contains a calcium compound.

5. The alkaline secondary battery according to claim 1, wherein the anion conductive membrane includes particles of an intercalation compound with anion exchange ability as the particles of at least one metal compound.

6. The alkaline secondary battery according to claim 1, wherein the particles of at least one metal compound have an average particle size of 100 nm or more and 1 μm or less.

7. The alkaline secondary battery according to claim 1, wherein the silver oxide contains at least one element selected from the group consisting of Bi, Pb, Zr, Sn, Mn, and Ti in particles in an amount of 2 to 13% by mass.

8. The alkaline secondary battery according to claim 1, wherein the positive electrode contains a manganese oxide.

9. The alkaline secondary battery according to claim 1, wherein the alkaline electrolyte solution contains polyalkylene glycols.

10. The alkaline secondary battery according to claim 9, wherein the polyalkylene glycols have a weight average molecular weight of about 200 or more and 20000 or less.

11. The alkaline secondary battery according to claim 9, wherein the alkaline electrolyte solution containing the polyalkylene glycols is present in the negative electrode, and a content of the polyalkylene glycols in the negative electrode is 0.01 parts by mass or more and 5 parts by mass or less with respect to 100 parts by mass of the zinc-based particles.

12. The alkaline secondary battery according to claim 9, wherein the alkaline electrolyte solution contains zinc oxide.

13. The alkaline secondary battery according to claim 1, wherein the positive electrode contains AgO or $Ag_2O$.

14. The alkaline secondary battery according to claim 1, wherein the element contained in the particles of the silver oxide is in a trivalent or tetravalent oxidation state.

15. The alkaline secondary battery according to claim 1, wherein the battery case has an outer can and a sealing plate, and an inner surface of the outer can is provided with anti-corrosion metal.

16. The alkaline secondary battery according to claim 15, wherein the inner surface of the outer can is plated with gold.

* * * * *